US012134054B2

(12) United States Patent
Lucas et al.

(10) Patent No.: US 12,134,054 B2
(45) Date of Patent: Nov. 5, 2024

(54) FILTER SYSTEM AND REPLACEABLE FILTER CARTRIDGE

(71) Applicant: Ingersoll-Rand Industrial U.S., Inc., Davidson, NC (US)

(72) Inventors: Michael J. Lucas, Mooresville, NC (US); Christopher Leamon, Concord, NC (US); Daniel Patrick McGuinness, Charlotte, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/524,410

(22) Filed: Nov. 30, 2023

(65) Prior Publication Data
US 2024/0165550 A1 May 23, 2024

Related U.S. Application Data

(62) Division of application No. 17/699,556, filed on Mar. 21, 2022, now Pat. No. 11,865,481, which is a
(Continued)

(51) Int. Cl.
*B01D 46/00* (2022.01)
*B01D 46/24* (2006.01)
(Continued)

(52) U.S. Cl.
CPC ..... *B01D 46/0015* (2013.01); *B01D 46/0005* (2013.01); *B01D 46/0045* (2013.01);
(Continued)

(58) Field of Classification Search
CPC ............ B01D 46/0031; B01D 46/2414; B01D 46/0005; B01D 46/0015; F04C 29/026; F01M 2011/038
See application file for complete search history.

(56) References Cited

U.S. PATENT DOCUMENTS 3,036,711 A 5/1962 Wilhelm
4,035,306 A 7/1977 Maddocks
(Continued)

FOREIGN PATENT DOCUMENTS

CN 101060905 A 10/2007
CN 101351626 A 1/2009
(Continued)

OTHER PUBLICATIONS

Examination Report for Application No. EP19219020.5, dated May 10, 2023.
(Continued)

*Primary Examiner* — Robert Clemente
(74) *Attorney, Agent, or Firm* — Kevin E. West; Advent, LLP

(57) ABSTRACT

A filter system can include a replaceable filter cartridge having a spinner element structured to swirl a mixed flow of compressible fluid and oil, as well as an end cap used to enclose an open interior of a filter media of the filter cartridge. The filter cartridge can be configured to interface with and be supported by a mesh holder. A housing can be attached over the filter cartridge to enclose the system and create a flow path for a mixed flow of compressible fluid and oil. The replaceable filter cartridge can be constructed of materials suitable for disposal in a waste incineration process. The mesh holder can be inserted on a combo-block and secured in place by a compression fitting. A stand pipe can extend into the interior of the filter media and be coupled with a central passage of the mesh holder.

20 Claims, 6 Drawing Sheets

Related U.S. Application Data division of application No. 16/229,739, filed on Dec. 21, 2018, now Pat. No. 11,331,610.

(51) Int. Cl.
| | | |
|---|---|---|
| *F01M 11/03* | (2006.01) | |
| *F04C 29/02* | (2006.01) | |
| *F04D 29/70* | (2006.01) | |

(52) U.S. Cl.
CPC ... *B01D 46/2414* (2013.01); *F01M 2011/038* (2013.01); *F04C 29/026* (2013.01); *F04D 29/701* (2013.01)

(56) References Cited

U.S. PATENT DOCUMENTS

| | | | |
|---|---|---|---|
| 4,632,682 A | * | 12/1986 | Erdmannsdorfer ............ B01D 46/2414 55/504 |
| 5,028,318 A | | 7/1991 | Aslin |
| 5,066,391 A | | 11/1991 | Faria |
| 5,170,640 A | | 12/1992 | Heitmann et al. |
| 5,548,893 A | | 8/1996 | Koelfgen |
| 6,099,606 A | | 8/2000 | Miller et al. |
| 6,342,083 B1 | | 1/2002 | Spitzer |
| 7,442,220 B2 | | 10/2008 | Pearson et al. |
| 8,632,617 B2 | | 1/2014 | Münkel et al. |
| 9,539,533 B2 | | 1/2017 | Schulz et al. |
| 10,550,742 B2 | | 2/2020 | Zuerker et al. |
| 2005/0092179 A1 | | 5/2005 | Barnwell |
| 2006/0267600 A1 | | 11/2006 | Beatty |
| 2010/0000412 A1 | * | 1/2010 | Heikamp ............ B01D 46/003 96/189 |
| 2010/0031940 A1 | | 2/2010 | Mosset et al. |
| 2012/0167534 A1 | | 7/2012 | Munkel et al. |
| 2015/0068169 A1 | | 3/2015 | Schulz et al. |

FOREIGN PATENT DOCUMENTS

| | | |
|---|---|---|
| CN | 102149443 A | 8/2011 |
| CN | 104436944 A | 3/2015 |
| CN | 106345199 A | 1/2017 |
| DE | 19908377 A1 | 8/2000 |
| TW | 200523012 A | 7/2005 |
| WO | 2004009215 A1 | 1/2004 |
| WO | 2013010818 A1 | 1/2013 |
| WO | 2017032447 A1 | 3/2017 |

OTHER PUBLICATIONS

Examination Report for European Application No. 19219020.5, dated Jan. 17, 2022.
Examination Report for European Patent Application No. 19219020.5, dated Jul. 7, 2021.
Extended European Search Report for European Application No. 19219020.5, dated Jul. 24, 2020.
Office Action for Chinese Application No. 201911329027.4, dated Jan. 6, 2022.
Office Action for Chinese Application No. 202210604128.3, dated Jul. 27, 2023.
Office Action in China for Application No. 201911329027.4, dated Feb. 18, 2023.
Office Action in China for Application No. 201911329027.4, dated Jul. 12, 2022.
Office Action from Chinese Application No. 202210604128.3, dated Jan. 18, 2024.
Extended European Search Report for Application No. 24164121.6, dated Apr. 19, 2024.

* cited by examiner

FILTER SYSTEM AND REPLACEABLE FILTER CARTRIDGE

CROSS-REFERENCE TO RELATED APPLICATIONS

The present application is a divisional under 35 U.S.C. § 120 of U.S. patent application Ser. No. 17/699,556, filed Mar. 21, 2022, and titled "FILTER SYSTEM AND REPLACEABLE CARTRIDGE" which is a divisional under 35 U.S.C. § 120 of U.S. patent application Ser. No. 16/229,739, filed Dec. 21, 2018, and titled "FILTER SYSTEM AND REPLACEABLE FILTER CARTRIDGE." U.S. patent application Ser. No. 17/699,556 and U.S. patent application Ser. No. 16/229,739 are herein incorporated by reference in their entireties.

TECHNICAL FIELD

The present invention generally relates to filters used for a mixed flow of compressible fluid and oil, and more particularly, but not exclusively, to compressor systems having a replaceable coalescence filter cartridge.

BACKGROUND

Providing filter cartridges in filtering systems remains an area of interest. Some existing systems have various shortcomings relative to certain applications. Accordingly, there remains a need for further contributions in this area of technology.

SUMMARY

One embodiment of the present invention is a unique filter system with replaceable filter cartridge. Other embodiments include apparatuses, systems, devices, hardware, methods, and combinations for replaceable filters. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
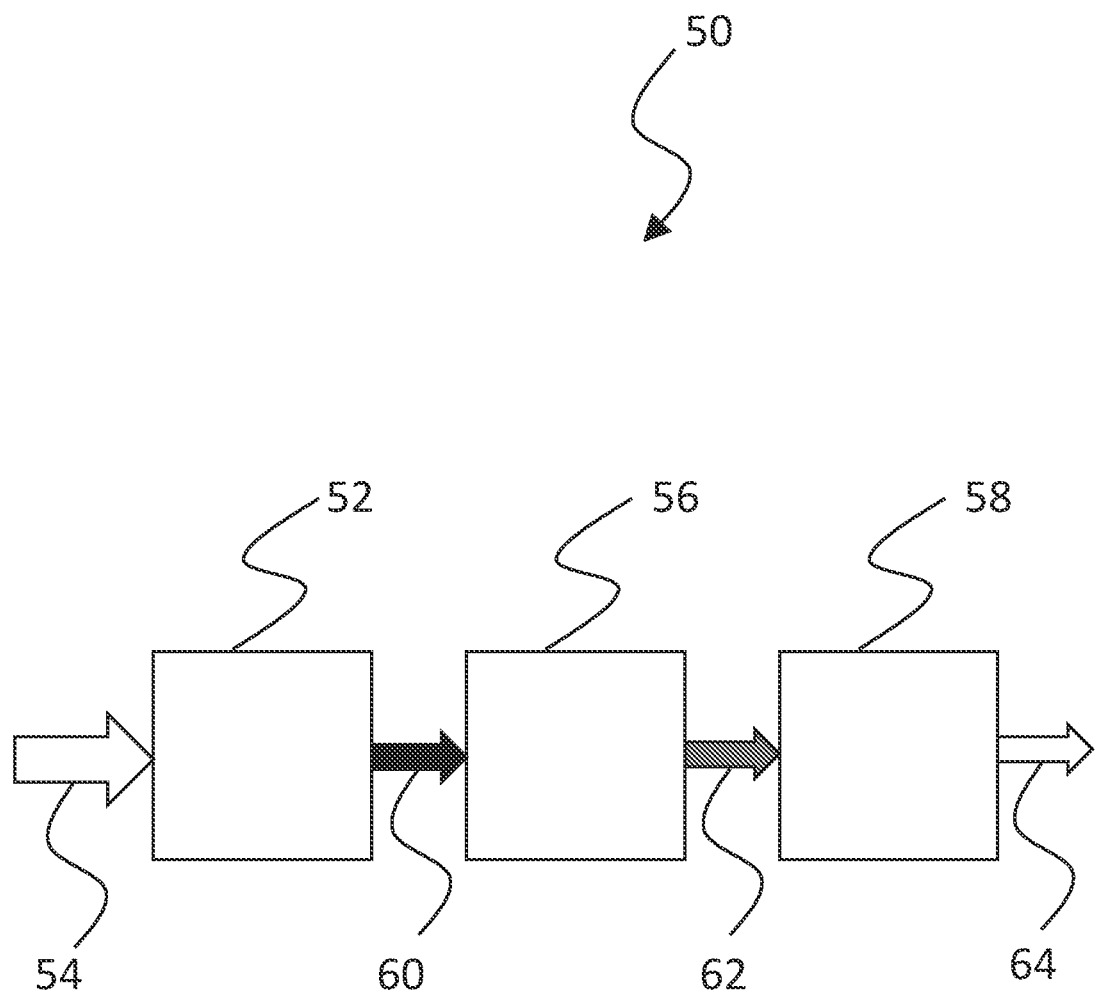
FIG. 1 depicts a compressor having devices useful to remove unwanted material from a flow of compressible fluid.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor system 50 is illustrated which includes a compressor 52 capable of providing compression to a compressible fluid 54 such as, but not limited to, air. Although embodiments described herein will make reference to air or compressed air, it will be appreciated that the compressor system 50 can be used to pressurize other types of compressible gases. The compressor 52 can take any variety of forms including but not limited to contact cooled screw compressors. Such contact cooled screw compressors can use any type of lubricant such as but not limited to oil.

In some embodiments the compressor system 50 can further include one or more devices 56, 58 to remove unwanted content from the flow of compressed air 60 provided by the compressor 52. In general, the compressor 52 can be in fluid communication one or more filter(s), air dryer(s), etc such as but not limited to the devices 56 and/or 58 depicted in FIG. 1. In one non-limited example, the compressor 52 can be coupled with a primary oil filter 56 and a secondary oil filter 58. Such a primary oil filter 56 can be of a centrifugal separator type to remove unwanted oil from the mixed flow of compressed air and oil 60, while the secondary oil filter 56 can be a device that uses a coalescence filter to further remove oil from the flow 62 to produce a cleaner flow 64. It will be appreciated that in some forms the coalescence filter 58 might be the only filter used in a compressor system 50, but can still be coupled with further devices for removing unwanted material from the flow of compressed air 60.

Figure 2:
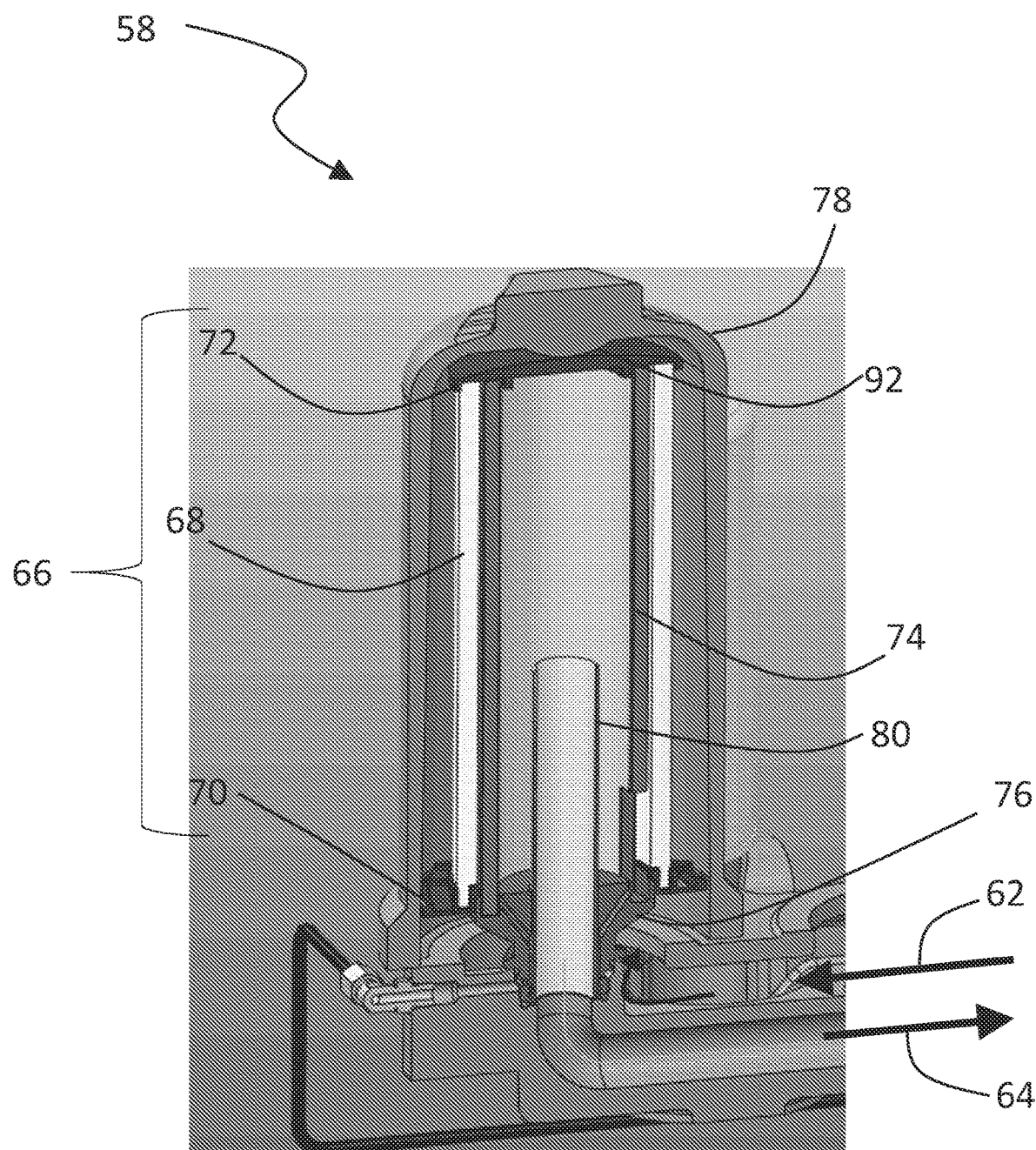
FIG. 2 depicts an embodiment of a filter system.
Figure 3:
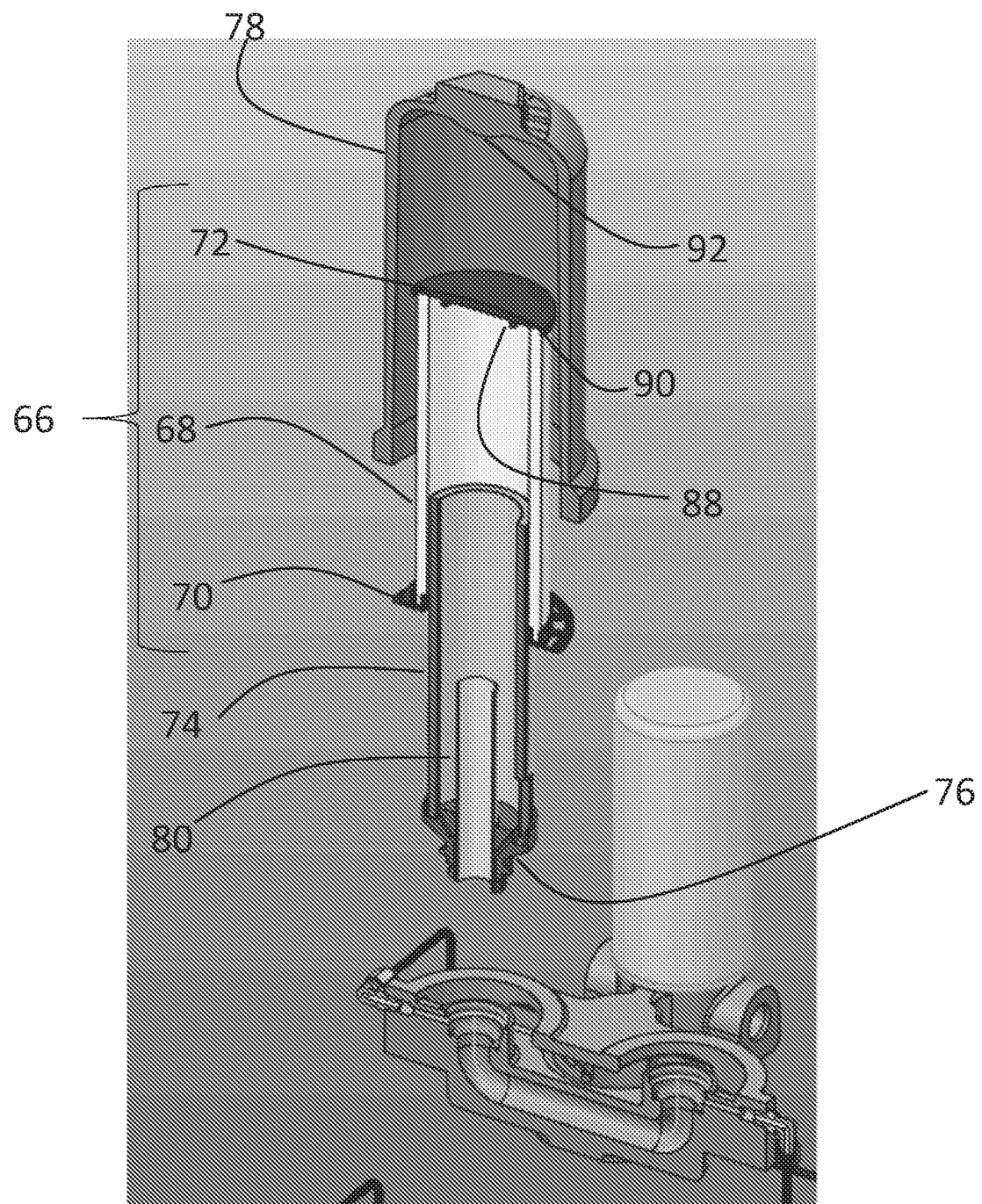
FIG. 3 depicts an embodiment of a filter system.

Turning now to FIGS. 2 and 3, one embodiment of a filter 58 is depicted which takes the form of a coalescence filter system. It will be appreciated that although the embodiment depicted in FIG. 2 is illustrated using reference numeral 58, some systems may not include the device 56, or may include a device 56 but not of the filtering type. No limitation is hereby intended that the filter 58 must be a secondary filter in any type of system that includes the features of the filter. Filter system 58 includes a replaceable filter cartridge 66 having a filter media 68 disposed between a spinner 70 and end cap 72. In one embodiment the replaceable cartridge 66 is inserted around a mesh filter member 74 which is situated upon a mesh holder 76. A housing 78 can be used to enclose the filter cartridge 66 and form various flow passages for the conveyance of a mixed flow of compressed fluid and oil as well as a filtered flow. The housing 78 can be attached to the base of the unit through a threaded or bayonet type connection, but other connection types are also contemplated. In one form the housing 78 is attached using a quarter-turn.

As a mixed flow of compressed air 62 enters the filter system 58 it travels down a conduit and it turned to flow upward and between the mesh holder 76 and the housing 78. As air is routed between the mesh holder 76 and the housing 78 is passes through the spinner 70 which imparts a circumferential rotation to the flow 62. Suitable space is provided between the filter media 68 and the housing 78 to permit swirling passage of the flow 62 and adequate distribution of the flow 62. In some forms, a circular shaped filter media 68 and inner surface of the housing 78 aid in the swirling motion of air. The mixed flow then traverses through the filter media 68 of the replacement cartridge 66 as well as traverses through the mesh filter element 74 before being received within an open interior of the replaceable filter cartridge 66. A standpipe 80 can be provided to extend away from the mesh holder 76 and is used to receive the flow of compressed fluid 64 after some or all of oil in the mixed flow 62 has been extracted via the filter media 68 and mesh filter element 74. The standpipe 80 can be an integral portion of the mesh holder 76, or can be a separate part that is integrated with the mesh holder 76. The flow received into the standpipe 80 is then directed out of the filter system 58 through a passage.

As contemplated herein, the filter cartridge 66 can be made as a replaceable module that can be manipulated/handled as a unitary whole as it is inserted into a filter system 58. It is envisioned that such a modular, stand-alone component can include the filter media 68 and at least one of the spinner 70 and end cap 72. In some forms the stand-alone cartridge 66 can include additional components beyond the filter media and either or both of the spinner 70 and end cap 72.

The filter media 68 can take on a variety of forms suitable to coalesce oil from the mixed stream 62 of compressed fluid and oil. In some embodiments the filter media 68 can be made of paper made using any variety of fiber material. In one form the filter media 68 can be made of rolled paper, but other forms are also contemplated such as pleated, etc.

Figure 5A:
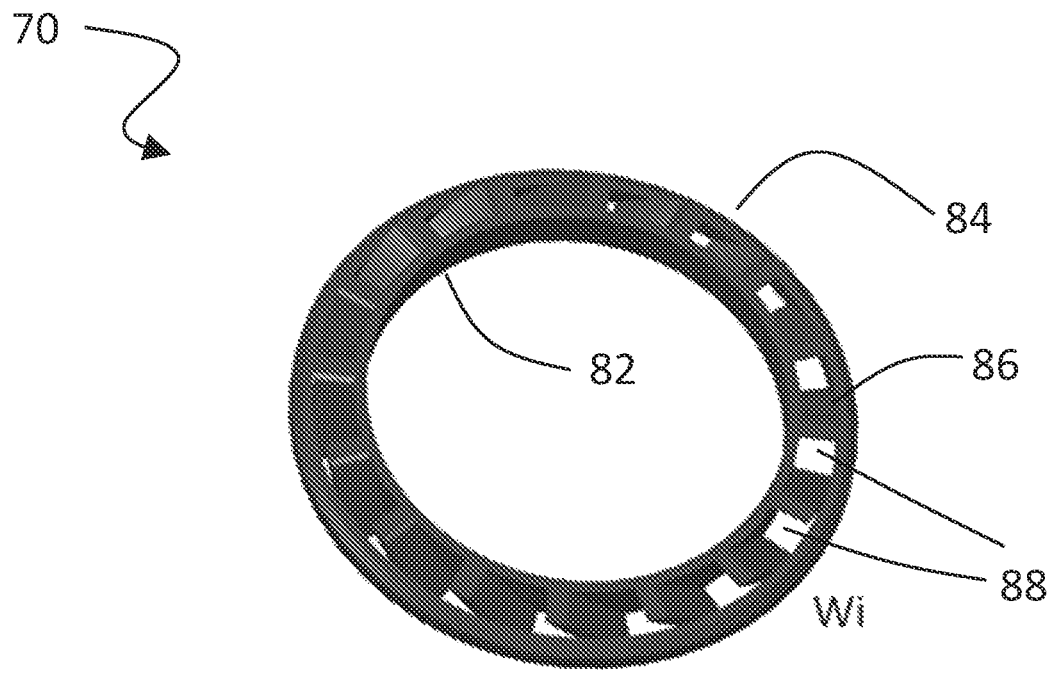
FIG. 5a depicts an embodiment of a spinner.
Figure 5B:
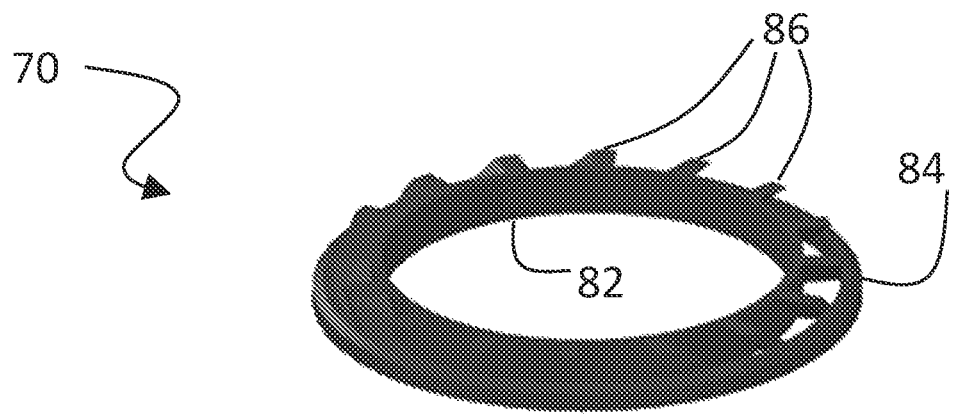
FIG. 5b depicts an embodiment of a spinner.

Turning now to FIGS. 5a and 5b, and with continued reference to FIGS. 1-3, one embodiment of the spinner 70 is depicted. The illustrated embodiment of the spinner includes an inner ring 82, outer ring 84, and airflow members 86 extending between the inner and outer rings. The airflow members 86 can take on any variety of forms including vanes, orifices, etc. In the form of vanes the airflow members 86 can extend between respective leading and trailing edges in any variety of manners. For example, the airflow members 86 can extend in a straight line between its leading and trailing edges. In some forms a camber line between the leading and trailing edges can be curved. In certain forms the camber line can be continuous or non-continuous. In still other forms the airflow members 86 can extend in a segmented manner between leading and trailing edges. In short, any variety of shapes are contemplated for the airflow members 86 of the spinner.

The airflow members 86 can furthermore impart any degree of circumferential motion of fluid flowing therethrough. In some forms the airflow members 86 can impart a relatively higher degree of circumferential motion than axial motion of the fluid, while in other forms the airflow members 86 can impart a relatively higher degree of axial motion than circumferential motion. In still other forms the circumferential and axial components of fluid velocity can be the same. As will be understood, whether or not the airflow members 86 take the form of vanes, orifices, etc., one or more airflow passages 88 will be formed in the spinner to traverse from an upstream side of the spinner to a downstream side. As such, the shape of the passages (which can be formed by neighboring vanes, for example) can dictate the degree of circumferential motion relative to the degree of axial motion of the air exiting the downstream side of the spinner 70.

Although the spinner 70 in the illustrated embodiment includes both inner ring 82 and outer ring 86, in other forms the spinner 70 can include fewer components. For example, the spinner 70 can have the outer ring 84 and airflow members 86, but lack the inner ring 82. In such a form the airflow members 86 can be individually affixed to the filter media. In other forms the spinner 70 can have the inner ring 82 and airflow members 86 but otherwise lack an outer ring 84.

The spinner 70 can be attached to the filter media 68 via any suitable manner, whether mechanical, bonding, or otherwise. In some forms the spinner 70 can be attached using chemical bonding such as through an adhesive process such as gluing or epoxying. Epoxy can include can be any of a basic component or cured end products of epoxy resins, as well as represent the epoxide functional group. Any suitable type of adhesive is contemplated.

Figure 6:
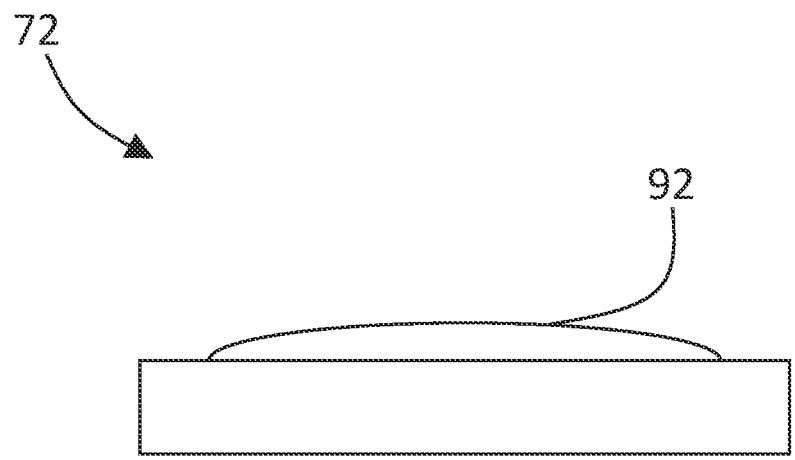
FIG. 6 depicts an embodiment of an end cap.

Turning now to FIG. 6, and with continued reference to FIGS. 1-3, one embodiment of the end cap 72 is depicted. The end cap 72 can be used to enclose the open interior of the filter media 68. The end cap can include an annular slot defined between an inside wall 88 and outside wall 90 which can be used to receive the filter media 68 and in some embodiments also receive the mesh filter element 74. Either or both of the inside wall 88 and outside wall 90 can extend uninterrupted around the periphery of the filter media 68, but in some forms either or both of the inside wall 88 and outside wall 90 can include a broken configuration. The size of the annular slot between the inside wall 88 and outside wall 90 can receive both of the filter media 68 and mesh filter element 74. In some forms the inside wall 88 can include a chamfer or sloped edge to pilot the mesh filter element 74 when the filter cartridge 66 is inserted onto the mesh filter element 74.

As illustrated in FIG. 3, the housing 78 can include a protuberance 92 which can be used to urge the filter cartridge 66 into a seated position upon the mesh holder 76. In alternative and/or additional embodiments, the protuberance 92 can be located on the end cap 72 as depicted in FIG. 6. The protuberance 92 can take on any suitable form and is generally located within the outer periphery of the end cap 72. Wherever it is located, the protuberance 92 can one or more raised surfaces which are typically blunted in shape as shown.

The end cap 72 can be attached to the filter media 68 via any suitable manner, whether mechanical, bonding, or otherwise. In some forms the end cap 72 can be attached using chemical bonding such as through an adhesive process such as gluing or epoxying. Epoxy can include can be any of a basic component or cured end products of epoxy resins, as well as represent the epoxide functional group. Any suitable type of adhesive is contemplated.

The material type of each of the filter media 68, spinner 70, and end cap 72, can all be different, but in some forms one or more of the materials used for the filter media, spinner, and end cap can be the same. Reference will be made immediately below to the type of material the filter media 68 is made of and its capability of being disposed of through burning (e.g. through an incineration process such as waste treatment incineration). The discussion below related to the incineration of the filter media material is also applicable to the material used in the construction of the spinner and end cap. In some embodiments the material type of the spinner 70 and/or end cap 72 are different from the filter media material, but it will nevertheless be understood that the description below of waste disposal of the filter media also applies to the spinner 70 and end cap 72 as well. The filter media 68 can be made of a filter media material that can be burned, such as through combustion, in a process that can be characterized by a high temperature exothermic redox chemical reaction between a fuel and an oxidant. Thermal oxidation of the filter media material can include a combustion process such as deflagration or any other high-temperature exothermic reaction between a fuel and oxidant. The filter media 68 can act as the fuel to be thermally oxidized with an oxidant such as but not limited to air. It is contemplated that in some embodiments the filter media material can be consumed via thermal oxidation and provide a greater thermal energy output as a result of the thermal oxidation than the amount of energy input to provide the elevated temperatures needed for the thermal oxidation to occur.

It is contemplated that any or all of the filter media material, spinner material, and end cap material are made of a material that can be disposed of via incineration in a waste treatment process. In some embodiments of the material types incineration can convert the components (filter media, spinner, and/or end cap) into ash, flue gas, and heat. The material type can provide energy recovery during the incineration process. It is contemplated that the material type used in some embodiments of any of the components to be incinerated meets with applicable regulations of material type suitable for incineration, whether those regulations are promulgated by the United States Environmental Protection Agency, among any potential others. Various types of incineration processes are contemplated, including burn piles, burn barrels, moving grates, fixed grate, rotary kiln, fluidized bed, and specialized incineration.

In one form the spinner material is contemplated to be made of plastic, such as but not limited to organic polymers that can be of a thermoplastic or thermosetting type polymer. It is contemplated that the wide range of plastic materials suitable for use as the spinner material can be thermally oxidized in an incineration process as mentioned above anywhere in a temperature range of between about 200 C (390 F) to about 600 C (1100 F), but other ranges may be useful for other plastic-like materials.

In one form the end cap material is contemplated to be made of rubber or other suitable type of elastomer, such as but not limited to those materials that include polyisoprenes or organic compound isoprenes. It is contemplated that the wide range of rubber materials suitable for use as the end cap material can be thermally oxidized in an incineration process as mentioned above anywhere in a temperature range of between about 250 C (480 F) to about 350 C (662 F), but other ranges may be useful for other rubber-like materials.

The mesh filter element 74 can take on a variety of forms and be made from a variety of materials. In one embodiment the mesh filter element 74 can be a wire mesh construction made of any suitable metallic wire fiber. The mesh construction can be woven or non-woven, depending on the application. Such non-woven construction can be made from short and long fibers which can be bonded together using chemical, mechanical, heat, or solvent treatments. The non-woven embodiments can be flat or tufted porous sheets.

Figure 4:
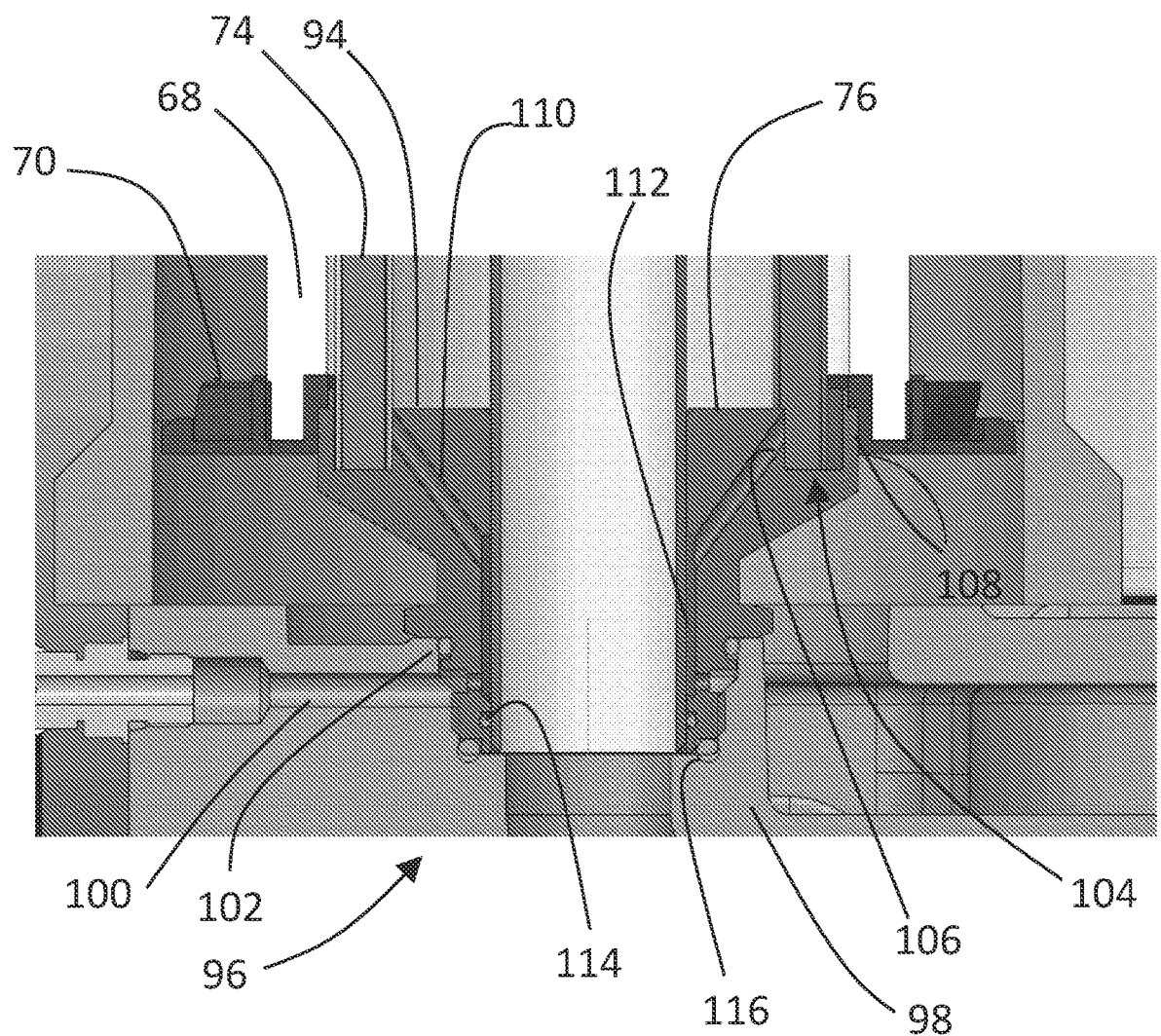
FIG. 4 depicts an embodiment of a mesh holder.

Turning now to FIG. 4, and with continued reference to FIGS. 1-3, one form of a mesh holder 76 is depicted. The mesh holder 76 can include a wide end 94 and a narrow end 96 disposed opposite the wide end 94 which generally takes a frusta-conical shape similar to a truncated cone. The mesh holder 76 is coupled with a combo-block 98 which includes a drain line 100 which carries oil away from the mesh holder 76. The combo-block 98 can be any suitable device that provides a seat for the mesh holder 76 and that receives collected oil from the mesh holder 76. The mesh holder 76 can be coupled to the combo-block 100 via a compression fit via one or more seals such as but not limited to a-rings 102. Further details of the coupling of the mesh holder 76 and combo-block 100 are described further below.

The mesh holder 76 includes an annular groove 104 defined between an inner wall 106 and outer wall 108. The annular groove 104 is structured to receive the mesh filter element 74. The outer wall 102 can be sized larger than the inner wall 100 such that oil that collects in the annular groove 104 is discouraged from radially escaping the mesh holder 76 and draining down the side. The mesh holder 76 also includes one or more drain lines 110 in fluid communication with the annular groove 104 to carry away oil that has been collected as a result of the filtering.

Oil collected in the annular groove 104 can flow through drain line 110 to a gallery 112 located between the stand pipe 80 and the mesh holder 76. The gallery 112 can be any shape and size and in one form is annular in shape. The gallery 112 is in fluid communication with the drain line 100 of the combo-block 98. Various seals 114 and 116 can also be used to discourage oil from escaping beyond the drain line 100. Seals 114 and 116 can be a-rings, but other types of seals are also contemplated.

The filter cartridge 66 can interface with the mesh holder 76 via the spinner 70, although other engagement interfaces are also contemplated. As shown in FIG. 4, the spinner can include a stepped feature to fit upon the outer edge of the mesh holder 76 near the outside wall 90. The outside wall 90 includes a complementary stepped feature to receive the spinner 70.

Although the mesh holder 76, stand-pipe 80, and combo-block 98 are depicted as separate elements that together help support and drain oil away from the filter cartridge 66, in some embodiments two or more of these components and be made integral with each other.

One aspect of the present application includes an apparatus comprising a replaceable filter cartridge having a filter media that extends in an axial direction from a first end to a second end, the replaceable filter cartridge having an annular-shaped airflow spinner affixed to an outer surface of the filter media such that the replaceable filter cartridge is modular and can be handled as a unitary whole as it is inserted into a filter housing, the annular-shaped airflow spinner including a plurality of passages defined by a plurality of swirl inducing airflow members, the airflow members structured to impart a circumferential component of swirl to a passing flow of fluid when the replaceable filter cartridge is installed in a filter cartridge housing.

A feature of the present application includes wherein the annular-shaped airflow spinner is bonded to the filter media.

Another feature of the present application includes wherein the plurality of airflow members are airflow vanes each having a leading edge and a trailing edge, each of the plurality of passages defined by a top surface of one of the airflow vanes and a bottom surface of an adjacent one of the airflow vanes.

Yet another feature of the present application includes wherein the filter media is made from a filter media material having a composition that will thermally oxidize under elevated temperatures, and wherein the annular-shaped airflow spinner is made from a spinner material having a composition that will thermally oxidize under elevated temperatures.

Still another feature of the present application includes wherein the spinner material thermally oxidizes at a temperature below about 600 C (1100 F).

Yet still another feature of the present application includes wherein the annular-shaped airflow spinner forms an abutment surface structured to seat against a filter canister housing, and wherein the annular-shaped airflow spinner is chemically bonded to the filter media.

Still yet another feature of the present application includes wherein an end cap is affixed to the filter media at a second end to seal an open interior of the filter media, the end cap including a recess to receive the filter media, the recess large enough to accommodate a complementary mesh filter when inserted into the open interior of the filter media.

A further feature of the present application includes wherein the end cap is bonded to the filter media at the second end, and wherein the end cap includes an exterior protrusion extending from a top surface of the cap in a direction away from the open interior, the exterior protrusion constructed to engage a filter housing.

Another aspect of the present application includes an apparatus comprising: a filter cartridge having a filter media that extends along an axial direction and having a circular cross section, the filter media structured to remove lubricant entrained in a flow of compressed gas, the filter cartridge further including an end cap connected at a first axial end of the filter media to enclose an open interior of the filter media, the end cap having an arcing groove formed on an inside surface located interior of the filter media, the arcing groove defined between an inner groove wall and an outer groove wall, a distance between the inner and outer groove walls sized to fit the filter media, the end cap defined by a peripheral boundary and having a blunted protrusion extending from an interior of the peripheral boundary, the blunted protrusion structured to contact an inner surface of a filter housing to provide a positive pressure to the filter cartridge.

A feature of the present application includes wherein the end cap includes a single blunted protrusion located radially inward from an outer periphery of the end cap.

Another feature of the present application includes the blunted protrusion taking the form of a nub having a rounded contact point, and wherein the blunted protrusion extends from the center of the end cap.

Still another feature of the present application includes wherein the end cap is chemically bonded to the filter media, and wherein the end cap is made from an end cap material having a composition that will exothermically oxidize under elevated temperatures.

Yet another feature of the present application includes wherein the arcing groove is an annular shaped groove, and wherein the end cap is chemically bonded to the filter media.

Still yet another feature of the present application includes wherein the distance between the inner and outer groove walls is sized to accommodate a secondary filter media in addition to the filter media chemically bonded to the end cap.

Yet still another feature of the present application includes wherein a spinner is affixed to a second axial end of the filter media opposite the first axial end, wherein the spinner is affixed via chemical bonding, and wherein the filter cartridge with end cap and spinner are constructed as a modular device capable of being handled as a unitary whole as the filter cartridge is inserted into a filter housing.

A further feature of the present application includes wherein the filter media is made of a material that corn busts under elevated temperatures, wherein the end cap is made of a material that corn busts under elevated temperatures, and wherein the spinner is made of a material that corn busts under elevated temperatures.

A still further feature of the present application includes wherein the spinner includes a plurality of passages structured to impart a circumferential rotation to a flow of fluids passing through the spinner, and wherein the plurality of passages is defined by a plurality of spinner vanes.

Yet another aspect of the present application includes an apparatus comprising an oil filter assembly structured to remove oil from a mixed flow of compressed air and oil, the oil filter assembly having: a combo-block base which includes a combo-block oil passage for the receipt of oil removed from the mixed flow by action of the oil filter assembly, a frusta-conical shaped mesh holder having an open interior extending between a first base of the frusta-conical shape and an opposing second base of the frusta-conical shape, the mesh holder further including an annular well defined in the first end which is structured to receive a wire mesh filter component, the mesh holder further including at least one oil passage that extends from the annular well to the open interior, and a stand-pipe extending from the open interior and away from the first end.

A feature of the present application includes wherein the stand-pipe is inserted as a separate component into the open interior of the mesh holder, wherein the mesh holder is coupled to the combo-block base via an a-ring compression fitting, and wherein an annular space is formed between an outside of the stand-pipe and an interior wall of the mesh holder that defines the open interior, the annular space in communication with the at least one oil passage.

Another feature of the present application includes wherein the mesh holder further includes an outer wall defining the annular well, the outer wall extending away from the first end to form a dam structured to discourage oil from flowing radially outward away from the mesh holder, and wherein the oil filter assembly further includes a removable housing having an interior surface structured to abut a replaceable oil filter element seated against the mesh holder.

An aspect of the present application includes a method comprising: providing a filter media having a material composition structured to provide exothermic oxidation at an elevated filter media combustion temperature, affixing an annular spinner to a first end of the filter media, the annular filter structured to provide a circumferential component of fluid velocity traversing from one side of the annular spinner to an opposing side of the annular spinner, the annular spinner having a material composition structured to provide exothermic oxidation at an elevated spinner combustion temperature, and chemically bonding an end cap to a second end of the filter media, the end cap having a material composition structured to provide exothermic oxidation at an end cap combustion temperature.

A feature of the present application includes wherein the affixing includes applying a chemical bonding agent between the filter media and the annular spinner.

Another feature of the present application includes wherein the chemically bonding includes positioning an annular groove of the end cap over an annular end section of the filter media, wherein the filter media material composition is paper, and wherein the paper is rolled.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported,"

and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
an oil filter assembly structured to remove oil from a mixed flow of compressed air and oil, the oil filter assembly having:
a combo-block base which includes a combo-block drain line for the receipt of oil removed from the mixed flow by action of the oil filter assembly;
a frusta-conical shaped mesh holder having an open interior extending between a first base of the frusta-conical shape and an opposing second base of the frusta-conical shape, the mesh holder further including an annular well defined in the first end which is structured to receive a wire mesh filter component, the mesh holder further including at least one oil passage that extends from the annular well to the open interior; and
a stand-pipe extending from the open interior and away from the first end.

2. The apparatus of claim 1, wherein the stand-pipe is inserted as a separate component into the open interior of the mesh holder.

3. The apparatus of claim 1, wherein the mesh holder further includes an outer wall defining the annular well, the outer wall extending away from the first end to form a dam structured to discourage oil from flowing radially outward away from the mesh holder.

4. The apparatus of claim 1, wherein the mesh holder is coupled to the combo-block base via a compression fit.

5. The apparatus of claim 4, wherein the compression fit is an a-ring compression fitting.

6. The apparatus of claim 1, wherein a gallery passage is formed between an outside of the stand-pipe and an interior wall of the mesh holder that defines the open interior, where the gallery passage is in communication with the at least one oil passage.

7. The apparatus of claim 6, wherein the gallery passage is in fluid communication with the combo-block drain line, the gallery passage directing oil from the at least one oil passage to the combo-block drain line.

8. The apparatus of claim 1, wherein the oil filter assembly further includes a removable housing having an interior surface structured to abut a replaceable oil filter element seated against the mesh holder.

9. An apparatus comprising:
an oil filter assembly structured to remove oil from a mixed flow of compressed air and oil, the oil filter assembly having:
a filter housing;
a combo-block base supporting the filter housing and including a combo-block drain line for the receipt of oil removed from the mixed flow by action of the oil filter assembly;
a frusta-conical shaped mesh holder disposed within the filter housing, the mesh holder having an open interior extending between a first base of the frusta-conical shape and an opposing second base of the frusta-conical shape, the mesh holder further including an annular well defined in the first end which is structured to receive a wire mesh filter component, the mesh holder further including at least one oil passage that extends from the annular well to the open interior; and
a stand-pipe extending from the open interior and away from the first end.

10. The apparatus of claim 9, wherein the stand-pipe is inserted as a separate component into the open interior of the mesh holder.

11. The apparatus of claim 9, wherein the mesh holder further includes an outer wall defining the annular well, the outer wall extending away from the first end to form a dam structured to discourage oil from flowing radially outward away from the mesh holder.

12. The apparatus of claim 9, wherein the mesh holder is coupled to the combo-block base via a compression fit.

13. The apparatus of claim 12, wherein the compression fit is an a-ring compression fitting.

14. The apparatus of claim 9, wherein a gallery passage is formed between an outside of the stand-pipe and an interior wall of the mesh holder that defines the open interior, where the gallery passage is in communication with the at least one oil passage.

15. The apparatus of claim 14, wherein the gallery passage is in fluid communication with the combo-block drain line, the gallery passage directing oil from the at least one oil passage to the combo-block drain line.

16. The apparatus of claim 9, wherein the filter housing is a removable housing having an interior surface structured to abut a replaceable oil filter element seated against the mesh holder.

17. An oil filter assembly comprising:
a filter housing;
a combo-block base supporting the filter housing and including a combo-block drain line for the receipt of oil removed from the mixed flow by action of the oil filter assembly; and
a frusta-conical shaped mesh holder disposed within the filter housing, the mesh holder having an open interior extending between a first base of the frusta-conical shape and an opposing second base of the frusta-conical shape, the mesh holder further including an annular well defined in the first end which is structured to receive a wire mesh filter component, the mesh holder further including at least one oil passage that extends from the annular well to the open interior.

18. The oil filter assembly of claim 17, further including a stand-pipe extending from the open interior and away from the first end, wherein the stand-pipe is inserted as a separate component into the open interior of the mesh holder, wherein the mesh holder is coupled to the combo-block base via an a-ring compression fitting, and wherein an annular space is formed between an outside of the stand-pipe and an interior wall of the mesh holder that defines the open interior, the annular space in communication with the at least one oil passage.

19. The oil filter assembly of claim 17, wherein the mesh holder further includes an outer wall defining the annular well, the outer wall extending away from the first end to form a dam structured to discourage oil from flowing radially outward away from the mesh holder.

20. The oil filter assembly of claim 17, wherein a gallery passage is formed between an outside of the stand-pipe and an interior wall of the mesh holder that defines the open interior, where the gallery passage is in communication with the at least one oil passage and the combo-block drain line, the gallery passage configured to direct oil from the at least one oil passage to the combo-block drain line.

* * * * *